United States Patent

[11] 3,615,869

[72] Inventors Theodore R. Barker
Pasadena;
Wilfred L. Kershaw, Towson; George S. Stivers, Baltimore; Jack L. Thomas, Baltimore, all of Md.

[21] Appl. No. 474,547
[22] Filed July 26, 1965
[45] Patented Oct. 26, 1971
[73] Assignee Teledyne, Inc.
Los Angeles, Calif.

[54] RADIOISOTOPE THERMOELECTRIC GENERATOR
22 Claims, 3 Drawing Figs.

[52] U.S. Cl. .................................................... 136/202, 136/212, 206/0.4
[51] Int. Cl. .................................................... H01v 1/30, G21h 1/06
[50] Field of Search ........................................ 136/201–212; 206/0.4

[56] References Cited

UNITED STATES PATENTS

| | | | |
|---|---|---|---|
| 2,996,889 | 8/1961 | Roeder, Jr. | 136/204 X |
| 3,022,360 | 2/1962 | Pietsch | 136/203 |
| 3,075,030 | 1/1963 | Elm et al. | 136/208 |
| 3,262,820 | 7/1966 | Whitelaw | 136/202 |
| 3,266,944 | 8/1966 | Spira et al. | 136/202 X |
| 3,167,678 | 1/1965 | Griessel | 206/0.4 |
| 3,287,176 | 11/1966 | McAlvay | 136/230 X |
| 3,347,711 | 10/1967 | Banks, Jr. et al. | 136/202 |
| 3,357,866 | 12/1967 | Belofsky | 136/202 |

FOREIGN PATENTS

| | | | |
|---|---|---|---|
| 727,751 | 4/1955 | Great Britain | 206/0.4 |

*Primary Examiner*—A. B. Curtis
*Attorney*—Sughrue, Rothwell, Mion, Zinn & Macpeak

ABSTRACT: An improved thermoelectric generator assembly including a heat sink member adapted to dissipate heat directly to the environment and having a thermoelectric conversion system removably connected thereto utilizing a thin cover having bellows-type sidewalls. The thermoelectric elements are positioned within perforations formed in a platelike insulating disk. The heat sink member is removably connected to a cylindrical container, which may be cup shaped, and which is formed of a radiation shielding material. A shielded radioisotopic fuel capsule is positioned within the container and separated therefrom by thermal insulation in solid configuration retaining form.

INVENTORS
THEODORE R. BARKER
WILFRED L. KERSHAW
GEORGE S. STIVERS
JACK L. THOMAS

BY Sughrue, Rothwell, Mion, Zinn & Macpeak
ATTORNEYS

INVENTORS
THEODORE R. BARKER
WILFRED L. KERSHAW
GEORGE S. STIVERS
JACK L. THOMAS

BY Sughrue, Rothwell, Mion, Zinn, & Macpeak
ATTORNEYS

INVENTORS
THEODORE R. BARKER
WILFRED L. KERSHAW
GEORGE S. STIVERS
JACK L. THOMAS

BY Sughrue, Rothwell, Mion, Zinn & Macpeak
ATTORNEYS.

RADIOISOTOPE THERMOELECTRIC GENERATOR

This invention relates to an improved, thermoelectric generator assembly including a radioisotope heat source and more particularly to such an assembly having a thermopile subassembly in module form allowing field replacement of either the thermopile subassembly or the radioisotope heat source without compromising the safety of the service personnel.

With the increase in accessibility, and reduction in cost of various radioisotope fuels, a highly reliable and long life thermoelectric generator is within the realm of practicability, especially where such generators are used in terrestrial applications where service support is practically impossible.

Small wattage electrical generators are required in many remote terrestrial locations. The specific location may be inaccessible, such as several miles beneath the sea, at the top of the highest mountain ranges, at extreme geographical pole areas, or on remote, uninhabited islands, etc. In such cases, electrical generators are used to supply electrical power to continuously operating weather stations, channel markers, foghorns, underwater sonar devices, or completely automated processing systems. It is highly desirable to provide a power source which is extremely reliable, of long life (in the matter of years) and which will require minimum service support.

In the past, these needs have been met by power systems involving a multitude of conventional dry or wet cell batteries and/or conventional fuel powered electrical generators with attendant controls to regulate power delivery and battery recharging. Such systems require periodic servicing and have relatively low reliability. Further, where it is desirous to meet power requirements over an extended period of time, the physical mass of battery power required singularly defeats attempts to make use of such conventional systems.

The principal drawback to the use of atomic power as a reliable and long life source of energy, resides in the fact that atomic devices are potentially dangerous to the personnel within their immediate vicinity. Of course, even where atomic powered electrical generators are to be used in remote terrestrial applications characterized by total or almost complete inaccessibility, some danger to human life does exist; especially where limited service support must be provided over the relatively long life of the generator system.

Radioisotope-powered thermoelectric generators in which the thermal energy released by the radioisotope fuel, provides the necessary heat for the thermocouples, readily delivers such low-wattage electricity over an extremely long life.

Where the radioisotopic thermoelectric generators are used in space applications, the resultant radioactivity is of minor importance. Obviously, known special devices are not suited to terrestrial applications. In order to meet the Atomic Energy Commission license requirements for a thermoelectric generator assembly including a radioisotopic heat source, the assembly must meet the strength, fire-resistance, corrosion, etc. requirements of the Atomic Energy Commission for production and use, and the Interstate Commerce Commission requirements for transportation. Regardless of remoteness of the terrestrial location, a radioisotopic powered thermoelectric generator assembly must not, under normal circumstances, produce more than 10 mr./hr. radiation at one meter from the source under normal conditions, nor as a result of either the standard AEC test procedures, such as drop, puncture, fire, corrosion, etc. increase this radiation by a factor of 100.

Obviously, a terrestrial, radioisotopic thermoelectric generator assembly requires intensive radiation shielding. The addition of such shielding not only increases the cost of the assembly, and greatly adds to the overall weight, but it also impedes subsequent service support for either the thermoelectric generator subassembly or the radioisotopic fuel source. Past designs, while having advantages such as silent operation and lack of moving parts, have further tended to deploy the individual thermoelectric elements in a cylindrical array about the cylindrical radioisotopic capsule with the thermal energy passing radially from the source to the circumferentially positioned thermoelectric couples. These designs have been quite specific, limited to one power output and have been impossible to service in the field without the use of hot cell facilities.

It is therefore a primary object of this invention to provide an improved, low-cost, radioisotopic powered thermoelectric generator assembly which fully meets the ATomic Energy license requirements for encapsulated sources without compromising generator efficiency.

It is a further object of this invention to provide an improved low-cost, radioisotopic powered thermoelectric generator assembly which allows field replacement of either the thermoelectric generator subassembly or the radioisotopic fuel capsule without the use of hot cell facilities.

It is a further object of this invention to provide an improved, low-cost, radioisotopic powered thermoelectric generator assembly characterized by increased power flexibility.

In the field of radioisotope powered thermoelectric generators, past designs have tended to incorporate the thermoelectric conversion means as a cylindrical array positioned concentrically of the radioisotopic fuel capsule. These designs are characterized by rigidity, and by inability or complexity in servicing or replacing either the components of the conversion means or the radioisotopic heat source. In the area of fossil-fuel/thermoelectric converter systems as well as in the thermoelectric refrigerator art, attempts have been made to incorporate the thermoelectric couples into a modular arrangement. Some of the thermoelectric modules are in planar or sandwich form and generally comprise an apertured plate or disc of insulating material acting to support the thermoelectric elements for respective thermoelectric couples in electrically spaced fashion, in thermal contact with heat-receiving members and heat dissipating means. Regardless of the application, whether it be associated with a relatively high temperature radioisotopic fuel source, a liquid fuel burner, or in the refrigeration environment, the thermoelectric elements forming the couples are of a rather fragile nature, easily harmed by thermal and physical shock, as well as subject to being contaminated by the atmosphere, which readily changes the thermoelectric properties. Further, there is considerable criticality in regard to the thermal level and the thermal gradient existing across the thermocouple elements to provide maximum energy conversion efficiency. In all such systems the heat source temperature, and the rate of heat transfer must be carefully controlled. In many cases, this involves the attachment of a heat sink member having relatively large heat-dissipating surfaces. Since such devices involve the change or transformation of thermal energy to electrical energy, and since the structure employs electrically conductive metals, of necessity electrical insulation means must be employed to prevent shorting. The addition of the insulation means further tends to upset the thermal gradient and to block heat flow between the source and the heat sink across the thermoelectric conversion means. To provide the desired gradient and to maintain heat flow, it is advantageous to bias the thermoelectric elements into good thermal contact with the associated apparatus. In so biasing the thermoelectric elements, the resistance to physical shock is materially enhanced with improved thermal efficiency. Since the thermoelectric element may have the electrical characteristics modified greatly due to a small amount of atmospheric contaminant, it is important to maintain the thermoelectric conversion means in a completely sealed chamber, contaminant free, including means to modify the thermal conductivity of the support member to provide some control over the temperature gradient and rate of thermal flow across the elements.

Due to the possible physical and electrical failure of the thermoelectric elements forming the basic components of the thermoelectric couples, it is of course advantageous to provide an overall generator assembly which readily allows replacement and/or repair of the thermoelectric conversion means.

It is, therefore, a further object of this invention to provide an improved, low-cost thermoelectric conversion module incorporating simplified, easily assembled components of standard design to permit increased power flexibility and in which the module may be easily disassembled to promote uncomplicated and low-cost repairs.

It is a further object of this invention to provide an improved thermoelectric conversion module including a heat sink which may readily form the cover assembly for a radioisotopic heat source to thereby permit field maintenance and/or replacement of either the module or the fuel capsule without breaking the module seal.

It is a further object of this invention to provide an improved thermoelectric conversion module with increased flexibility in the size, type and configuration of the thermoelectric elements.

It is a further object of this invention to provide an improved thermoelectric conversion module for use with a low-cost radioisotopic heat source in which the thermoelectric module components are spring biased in thermal contact with the shielded radioisotopic capsule.

Further objects of this invention will be pointed out in the following detailed description and claims and illustrated in the accompanying drawings which disclose, by way of example, the principle of this invention and the best modes which have been utilized in applying this principle.

In general, the present invention is directed to an improved thermoelectric generator assembly which includes a centrally disposed radioisotopic heat source capsule carried by either an open cylindrical or cup-shaped container with radioactive shielding means surrounding said capsule and thermal insulation means carried by the container between the capsule and container wall. Thermoelectric conversion means in planar form overlies the open end or ends of the container whereby the majority of thermal energy released by the radioisotopic heat source capsule is directed axially to the thermoelectric conversion mean with such an assembly advantageously allowing either field replacement of the thermoelectric conversion means or the shielded radioisotopic capsule.

A preferred form of thermoelectric conversion means comprises a sandwich-type module including a metallic plate which acts both as a thermal heat sink and as a cover for the capsule container. A thermoelectric conversion assembly formed principally of a perforated plate formed of insulating material with thermoelectric elements carried by the perforations is carried by the metallic plate between the metallic plate and the shielded radioisotopic heat source capsule. The basic module is completed by a bellows assembly which includes a heat conductive cover overlying the thermoelectric conversion assembly and a bellowslike sidewall which surrounds the thermoelectric assembly and is sealingly coupled at one end to the heat sink and at the other end to the cover. During assembly the bellowslike wall is expanded to cause the thermoelectric elements to be compressed between the cover and the metallic plate to enhance conduction of thermal energy from the cover to the heat sink through the thermoelectric assembly. When the metallic heat sink plate is coupled to the capsule container, the bellows wall compresses slightly to maintain thermal energy conduction through the module while at the same time pressing the cover against the shielded radioisotopic heat source capsule.

Figure 1:
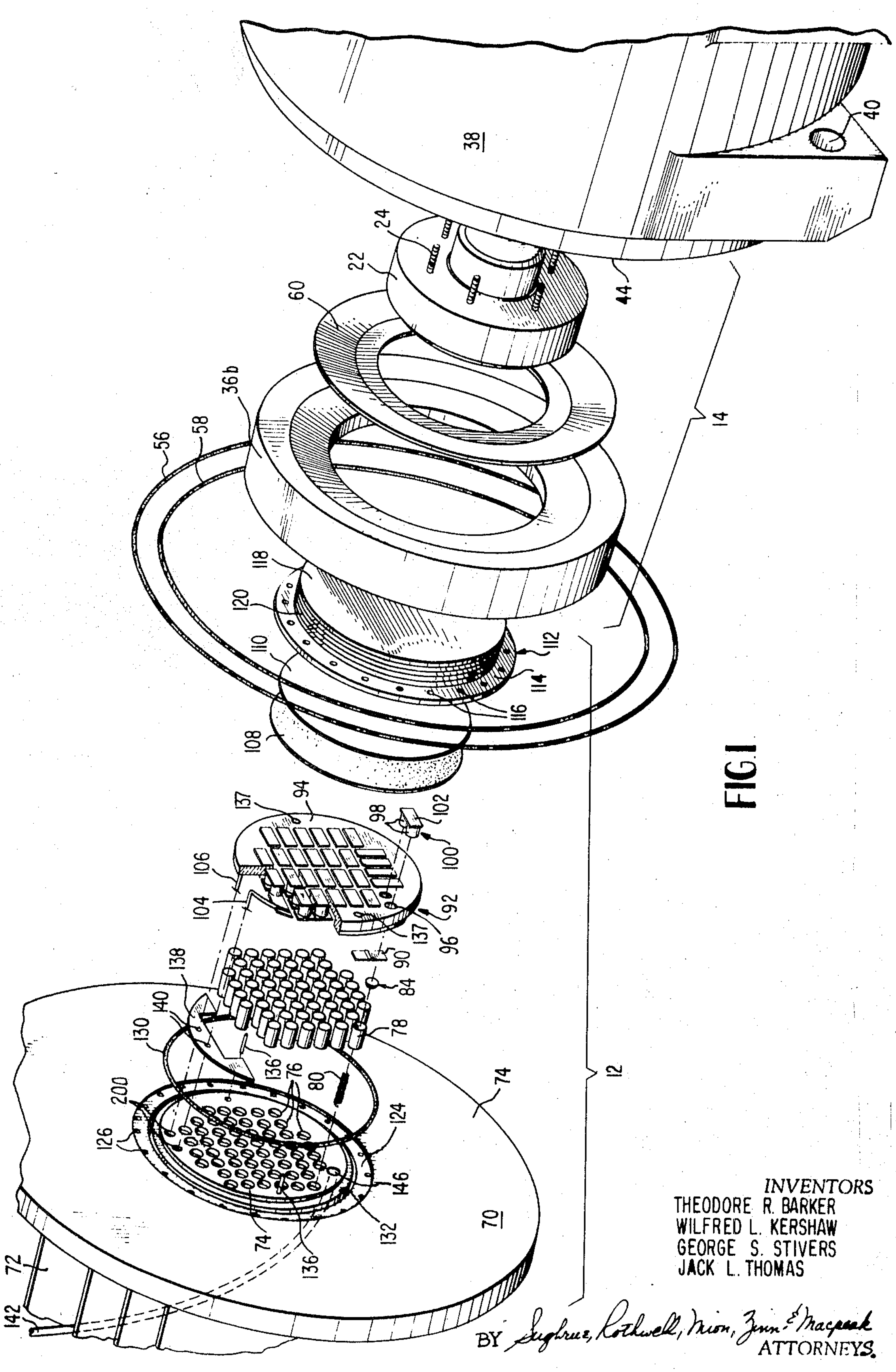
FIG. 1 is an exploded, perspective view of the improved radioisotopic powered thermoelectric generator of the present invention, with portions cut away to reveal internal structure.
Figures 2, 3:
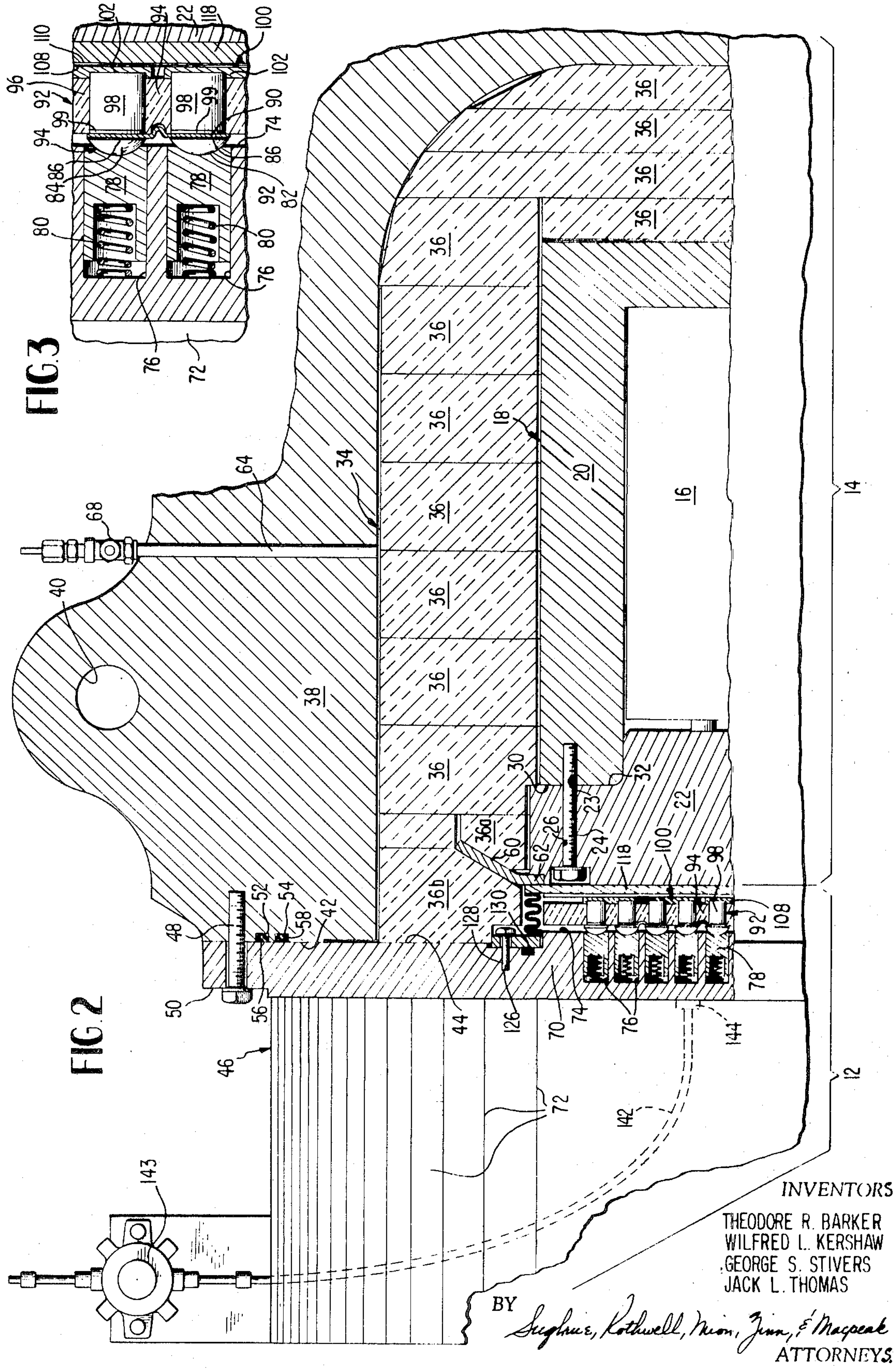
FIG. 2 is an elevational view, partially in section, of the apparatus shown in FIG. 1.
FIG. 3 is an enlarged elevation, in section, of a portion of the assembly shown in FIG. 2.

Referring to the embodiment shown in FIGS. 1 and 2, where the individual components are illustrated in both exploded fashion and as finally assembled, the improved radioisotopic powered thermoelectric generator assembly of the present invention, in one form, includes two main subassemblies, a thermoelectric conversion module indicated generally at 12 and an improved radioisotope thermal energy source assembly indicated at 14. The objects of the present invention are to a great extent met by the unique axial positioning of the thermoelectric conversion module and the radioisotopic thermal source with means to assure that in excess of 70 percent of the thermal energy emitted by the radioisotope capsule is directed axially toward the pancake type thermoelectric module 12.

It is further obvious that the axial, abutting relationship between the two main subassemblies conveniently allows either the thermoelectric conversion module 12 or the radioisotope energy source to be removed and/or replaced in minimum time, with relative ease, and with maximum safety to the support personnel.

The radioisotopic thermal source includes a centrally located gastight and liquidtight radioisotopic fuel capsule 16 of conventional configuration and construction which is essentially a suitable metal cylinder sealed at both ends and carrying a fuel source such as Strontium 90, Plutonium 238, Cerium 144, Cesium 137, or other known radioisotopic fuels. In the preferred form, due to the extended life to which the generator is to be used, Strontium-90 fuel operates quite satisfactorily. The casing of capsule 16 varies, depending upon the particular fuel used, since the casing or liner must be compatible with the fuel. For instance, if the fuel is Strontium 90 the liner or casing forming the capsule may be formed of "-Hastelloy C," a nickel-base superalloy manufactured under the trade name by the Haynes Stellite Corporation of Kokomo, Indiana. Insofar as the present invention is concerned, the radioisotopic heat source is not critical and the use of Strontium-90 fuel within a sealed Hastelloy C container is merely representative of one suitable combination which serves such a purpose. In this case the Strontium 90, having a long decay life, provides the desired thermal output over an extended period of time. The fuel capsule 16 is snugly received within an inner shield member 18 which in a preferred form is formed of tungsten although depleted uranium or other uranium alloys such as a molybdenum uranium alloy may be readily substituted. The inner shield 18 acts to reduce the nuclear radiation to an acceptable level since, if unshielded, the radiation from the capsule would kill a person in the immediate vicinity within a number of minutes, especially if the fuel were Strontium 90 due to its bremsstrahlung radiation. In the form shown, the inner shield comprises a cup-shaped member 20 and a T-shaped cap 22, the thickness of the T-shaped cap being in excess of the thickness of the sidewall of cup member 20. A plurality of bolts 24 pass through openings 26 within the cap member and are received within threaded bores 23 carried by the lip 30 of the cup-shaped shield. Thus, the lip 30 and the annular face 32 of the cap are in compression contact by bolts 24. The fuel capsule 16 and its inner shield 18 may be removed as a unit for ready replacement within the heat source subassembly 14.

Since the thermoelectric module is axially positioned at one end of the heat source 14, it is necessary to direct maximum thermal transfer toward the module with reduced thermal transfer in the other directions. To accomplish this, the inner shield is surrounded by thermal insulation. The insulation also has an overall cup shaped configuration with an internal diameter in the order of the shield cup diameter. As shown, the thermal insulation 34 comprises a series of apertured and solid discs 36 which may be formable, hardened fibrous insulator material manufactured under the brand name "Min-K" by the Johns-Manville Corporation of Manville, New Jersey. Obviously, the series of stacked discs may be replaced by a single cast element formed of the same material or equivalent thermal insulation material. The elements so far enumerated are received within a cast iron outer vessel or container 38 which is also cup shaped and includes a series of mounting holes 40 to facilitate transportation and mounting of the generator assembly. While the dimensions of the inner shield, the thermal insulation and the outer vessel may vary depending upon specific applications, for a 25-watt generator with a fuel capsule of approximately 3 inches in diameter, the thickness of the inner shield for maximum protection would be in the order of 2 to 4 inches for tungsten, the thickness of insulation would be in the order of 3 to 6 inches, while the cast iron outer vessel may be from 5 to 7 inches in thickness. With such dimensions for a fuel capsule having Strontium 90 as the fuel component and Hastelloy C as the liner, the thermal source would be sufficiently rigid, corrosion resistant, fire resistant, impact resistant, etc. and radioactively shielded to meet AEC license requirements. The cast iron outer vessel while acting as a container further acts as a radiation shield and in the present example, attenuates radiation by a factor of 100. While the cast iron outer vessel of this size would weigh on the order of 2,500 pounds or more, for a 25-watt generator system, the use of the cast iron of such a thickness reduces somewhat the amount of tungsten needed for the inner shield and since cast iron is considerably less expensive than tungsten, it would reduce the overall cost of the device.

The cast iron outer vessel 38 whose surface configuration is somewhat irregular, has a flat annular face 42 at the open end which abuts the contact face 44 of the heat sink member 46 forming a portion of the thermoelectric module 12. Of course, for shipping purposes or otherwise, the heat sink member 46 may be replaced by a simple flat metal disc (not shown). As assembled, the heat sink would be coupled to the cast iron outer vessel 38 by means of a plurality of bolts 48 which pass through annular rim 50 of the heat sink and are threadably received within the cast iron vessel 38. The face 44 of the cast iron vessel is recessed at 52 and 54 to receive a pair of concentric O-rings 56 and 58, respectively, or the like sealing members, the metal or elastomeric O-rings acting to provide a high integrity seal.

In order to prevent axial shifting of the fuel capsule 16 and its inner shield 18 within the thermal source subassembly 14, an annular metal retaining ring 60 is provided. The ring is slightly bent and has an inner diameter which is less than the outer diameter of cap 22 and an outer diameter greatly in excess thereof. The inner edge of the retaining ring is received within annular recess 62 formed at the outer periphery of cap 22 while the remaining portion of the ring is sandwiched between annular insulation ring **36*a* and a somewhat larger annular insulation ring 36*b*. With either the heat sink member 46 or a shipping cover (not shown) secured in place by screws 48, the annular retaining ring 60, overlying cap 22 and being sandwiched between the annular insulation members, will prevent axial movement of shield 18 and the fuel capsule 16** even under high inertia forces.

The iron vessel or container 38, comprising a relatively thick casting in the order of 5½ inches for the 25-watt example shown, acts as a container of high structural integrity. Thus, the container will provide a very good pressure vessel for underwater use; in this case the cover (not shown) will probably be formed of a much stronger material such as cast iron or steel. In replacing the heat sink member 46, there would be no compromise to proper heat dissipation since the surrounding water would tend to adequately cool the thermoelectric couples.

It should be noted that in the design of the present invention, the applicable heat source area of capsule 16 is much greater than the thermoelectric element area required to provide the 25-watt electrical energy, so that the need, as in some of the prior art radioisotope-powered thermoelectric generators, of placing the thermoelectric couples in radial fashion circumferentially of the fuel capsule is eliminated. This is partially due to the increased diameter of the individual thermoelectric elements. Thus, the thermoelectric conversion module may be advantageously centered axially, at the open end of the cast iron vessel and its associated cup-shaped insulator, whereby approximately three-quarters of the thermal energy is directed within a confined path directly to the thermoelectric converter elements.

In using Min-K thermal insulation in either unitary cup form, or as a series of stacked discs, if untreated, it tends to outgas as a result of the high temperatures surrounding the activated fuel capsule. Temperatures on the order of 900° F. plus over a period of time tend to cause the thermal insulation to outgas, changing the thermal conductivity of the gas-impregnated thermal insulation. If the outgases have a higher thermal conductivity than the charge gas the overall thermal conductivity of the insulation is increased while on the other hand, if the gases that evolve as a result of sustained heating of the thermal insulation, have a lower thermal conductivity than the charge gas, the overall thermal conductivity is reduced. Obviously the charge gas itself may be changed over the extended life of the generator to purposely vary the rate of heat transfer radially of the assembly. In order to prevent a change in overall thermal conductivity of the insulation, the Min-K thermal insulation or its equivalent is pretreated by heating so as to remove the residual gases from the insulation prior to placement in the cast iron outer vessel. After complete assembly, either with the heat sink member 46 mechanically sealed thereto, or a temporary covering or cap, residual gases may be further driven off by a second outgassing process, by means of tube 64 which is coupled to the inner surface of the cast iron outer vessel 66. Tube 64 may include suitable valve means shown at 68 which selectively couple the assembly to the outgassing processing apparatus (not shown). The container may then be charged with any suitable gas such as inert gases like argon, etc.

The second principal component or subassembly of the present invention resides in the thermoelectric conversion module or thermopile unit. Any suitable thermopile assembly, in module form or otherwise, may be mechanically coupled to a cast iron outer vessel so that the thermoelectric couples overlies annular opening adjacent the capsule shield cap and thus receive the majority of the thermal energy emanating from the fuel capsule. For instance, an appropriate thermopile assembly may take the form of the unit which is the subject matter of copending application Ser. No. 456,078 filed May 17,1965 by Allen J. Streb and John Kane entitled THERMOPILE ASSEMBLY and assigned to the common assignee.

Alternatively, the thermopile may take the form of the improved thermoelectric conversion module 12 including heat sink member 46 in juxtaposition to cap member 22. The thermoelectric conversion module is characterized by means for spring loading a thermoelectric conversion subassembly into thermal conductive relationship with the heat sink member 46 and the radioisotope heat source 14. The heat sink member 46 may be formed of cast or welded aluminum or magnesium or alloys thereof and has a main body section 70 of disc-shape configuration including a plurality of spaced fins 72 extending at right angles to the plane of the base. The number of fins, thickness, height and spacing may of course vary to provide the desired amount of heat transfer surface depending upon ambient conditions. The heat input face or surface 74 has formed therein, a series of uniformly spaced, in line, holes or apertures 76 which may be formed during the casting process or drilled as desired. The holes 76 receive respective alignment pistons 78. The alignment pistons are recessed at their heat sink ends to receive individual coil springs 80, whereby the coil springs tend to bias the alignment pistons 78 outwardly from their respective holes 76. The diameter of the alignment pistons are in the order of the holes 76 and are closely received thereby. Further, the length of the alignment pistons are such, with respect to the holes 76 that even when the springs 80 are at their free length, the inner portion of the alignment pistons still rest within their respective holes. Heat transfer is achieved radially between the circumferential surface of the alignment pistons and the holes. In order to enhance this heat transfer, aluminum grease may surround the pistons. The outer faces of the alignment pistons remote from the heat sink are provided with concave recesses 82 which receive hemispherical, solid, metallic buttons 84 to allow for misalignment due to manufacturing tolerance. In a preferred form, the alignment pistons are formed of aluminum thus being compatible to the heat sink assembly and the buttons, which are also formed of aluminum, may have an outer relatively thin coating 86 of aluminum oxide or the like to electrically insulate the buttons from copper bus straps 90. The bus straps selectively complete the electrical connection between ends of the thermoelectric couples. Since the bus straps 90 carry electrical current which would pass through the metal alignment pistons to the heat sink if not electrically insulated, the buttons 84 must include an insulative layer 86 selected to provide good thermal conduction in addition to retaining acceptable electrically insulative properties. This insulative layer should ordinarily be relatively thin, but must provide sufficient strength and surface hardness to allow the alignment pistons to bias the thermoelectric conversion subassembly 92 toward the thermal heat source. A preferred material consists of a thin layer of aluminum oxide although zirconium oxide, aluminum silicates, beryllia, zircon, steatite, titanates of calcium, strontium and magnesium may be substituted therefor depending upon the button material. The aluminum oxide material may be deposited on the flat surface of button 84 by anodic deposition or alternatively by conventional flame spray techniques. Where the anodic deposition method is used, a minimum depth of surface may be accomplished since the process develops an inherently uniform covering over the entire surface of the member. Two or 3 mils thickness is sufficient for the dual function of being electrically insulated and thermally conducted. A preferred "hardcoat" anodic coating is formed by the method set forth in U.S. Pat. No. 2,692,351 entitled METHOD OF FORMING HARDENED, ABRASION RESISTING COATINGS ON ALUMINUM AND ALUMINUM ALLOYS, issuing to C. F. Burroughs and assigned to the common assignee.

A principal element of the module of the thermoelectric conversion module, consists of the thermoelectric conversion subassembly indicated generally at 92 which consists of an annular disclike member of fibrous insulation or the like, which may comprise the same Johns-Manville Min-K material used as the insulation in the heat source subassembly. The insulation disc 94 is suitably apertured at 96 to receive the cylindrical thermoelectric elements 98 forming a portion of the couple assembly 100 including a hot shoe 102. Each thermocouple assembly 100 is conventional and elements 98 may be formed of telluride or the like with suitable doping agents to provide the desired N and P characteristics. The thermocouple assemblies 100 are thus supported by the apertured insulation disc 94. The cylindrical elements 98 may include cold shoes in the form of cast iron discs 99 which are bonded to the ends of the thermoelectric elements remote from the heat source. The number, size and configuration of the elements may vary depending upon electrical requirements, etc. The bus straps 90 are selectively coupled to the hot shoes of respective, adjacent thermoelectric couples so as to complete a desired series or series parallel circuit, between the thermoelectric elements depending upon the voltage and amperage demands of the system. The bus straps 90 are welded or soldered to the thermoelectric cold shoes by conventional techniques. Power leads 104 and 106 are electrically brazed to spaced bus straps with the leads extending exteriorly of the heat sink in electrically and fluid sealed fashion through heat sink apertures 200. Positioned adjacent the hot shoes 102 is a thin insulation disc or plate 108 which preferably is formed of mica which readily withstands the relatively high temperatures in the order of 900° F. or more to which the hot shoes of the thermoelectric couples are subjected. On the opposite side of the mica disc 108 is a thin second disc 110 formed of zirconium foil or the like. The disc 110 acts to adsorb or react with any retained undesirable reactive gases such as oxygen which may be produced by the high temperatures acting upon the Min-K insulation or its equivalent. It is extremely important that the thermoelectric elements are not subjected to oxidation since a small amount of oxidation is highly detrimental to the thermoelectric elements 98.

An important element of the thermoelectric conversion module resides in the bellows assembly 112 which consists of a relatively thick, rigid metal flange 114 which is apertured at 116. It is coupled to or formed integrally with, a thin sheet metal cover 118 by a multiple fold bellowslike sidewall 120. The bellows wall 120 is formed of relatively thin metal and forms, in conjunction with the heat sink disc 70, flange 114, and metal cover 118 a completely sealed enclosure for the elements making up the module. It is noted that the heat-receiving face 74 of the heat sink assembly 46 includes a relatively wide annular recess 124 which acts to receive flange 114. A plurality of bolts 128 pass through apertures 116 of flange member 114 and are received within threaded apertures 126 on the heat sink assembly, to mechanically couple the same to the heat sink. A conventional O-ring or the like sealing member 130 is received within recess 132 of the heat sink member. The diameter of the bellows assembly is in excess of the insulator disc 108, the getter disc 110 and the thermoelectric conversion assembly 92. Alignment pins 136 and alignment apertures 137 within thermoelectric subassembly 92 allow the components to be easily and quickly positioned on the heat sink, especially if the heat sink assembly is so positioned that its disclike base 70 is in a horizontal plane and the surface 74 is facing upwardly. To ensure electrical insulation of the power leads 104 and 106, a thin insulator strip 138 is positioned adjacent the heat sink surface 74 above the area of the thermoelectric conversion assembly 92 occupied by the thermoelectric couples. The leads 104 and 106 pass through suitable openings 140 formed therein, prior to passing through heat sink assembly apertures 106. During the assembly of the components, the bellows wall 120 readily expands to allow the bellows assembly flange 114 to be bolted to the heat sink 46. Springs 80 press their associated alignment pistons and buttons into contact with the bus straps carried by thermoelectric conversion assembly 92. The springs 80 are in an almost expanded or free position. Upon placing the bellows assembly on top of the thermoelectric conversion assembly and other elements, the flange 114 will be spaced slightly from its receiving recess 124. However, when the flange is bolted to the heat sink assembly, the alignment pistons will move inwardly, slightly compressing springs 80, while at the same time the convolutions of the bellows section 120 readily expand since the spring constant of the bellows 120 is much less than the total spring constant of the springs 80 individual alignment pistons.

With the thermoelectric conversion module fully assembled, the spring-biased alignment pistons place the thermoelectric conversion assembly 92 in good thermal contact with the metal cover 118 of the bellows assembly. The use of O-ring 130 allows a complete seal of the module assembly from the ambient while the bellows section 120 allows for ready thermal expansion and contraction of all elements.

Prior to coupling the module assembly to the fuel source, it is desirable to again outgas the Min-K insulation disc 94 supporting the thermoelectric couple. This is accomplished by means of conduit 142 which is coupled to the heat sink assembly at 144 adjacent heat sink aperture 146 and to outgassing means (not shown). A suitable valve 143 may be provided between the outgassing means and the conduit 142. The chamber provided by the bellows assembly 112 may further be examined after outgassing to ensure its gastight integrity using conventional methods such as the helium leak detection technique, and further an inert gas such as argon may be introduced into the cavity to reduce the likelihood of oxidation, particularly with respect to the thermoelectric elements. With regard to the employment of the inert gas within the area occupied by the thermal insulation surrounding the shield 18, it may be desirable to first introduce a gas of high thermal conductivity to increase the rejection of the heat through the insulation and the cast iron outer vessel 38 during the early period of use, since the radioisotopic energy release falls off appreciably and reaches a half-life level within a reasonably short time. Thereupon, an inert gas such as argon may replace the active gas to provide an overall decrease in thermal conductivity of the gas-impregnated insulation in an attempt to closely maintain the desired thermal gradient from the fuel source to the heat sink.

When the thermoelectric conversion module 12 is mechanically coupled to the heat source subassembly 14 in sealing relationship, prior to contact between the heat sink assembly face 74 and contact surface 44 of the cast iron outer vessel, the face plate 118 of the bellows assembly 112 contacts the outer surface of shield cup 22 to establish thermal contact therebetween. The bellows section 120 collapses slightly when heat sink 46 is mechanically coupled to the cast iron outer housing, tending to move the alignment pistons inwardly against the bias of their springs 80, thereby compressing the springs. Since the spring constant of the bellows section 120 is less than the combined spring constant of all of the springs 80, the bellows section 120 compresses to a much greater degree than the springs 80, to the point where the radial flange surface 74 of the heat sink assembly contacts face 44 of the cast iron vessel. Bolts 48 then secure the two main components together with the O-rings acting as satisfactory seals between the now coupled elements.

With the thermoelectric conversion module disassembled from the heat source, the springs 80 are at their near free length and are therefore not under full compressive load as when in assembled position. This assures that the compression coil springs 80 do not "set" before final assembly to the heat source. Further, with the bellows expanded, minimum compressive force is exerted upon the thermoelectric elements, but this force is sufficient to prevent physical deterioration of the thermoelectric elements should the conversion module be subjected to physical shock, etc. The relatively thin metal bellows section 120 acts as an extremely long heat transfer path to prevent the majority of heat from bypassing the thermoelectric assembly conversion assembly 92. Further, with the combined spring-biasing arrangement of the individual coil spring 80 and the bellows section 120, the elements forming the modular subassembly may readily expend or contract due to thermal change with minimum possibility of physical failure.

Figure 4:
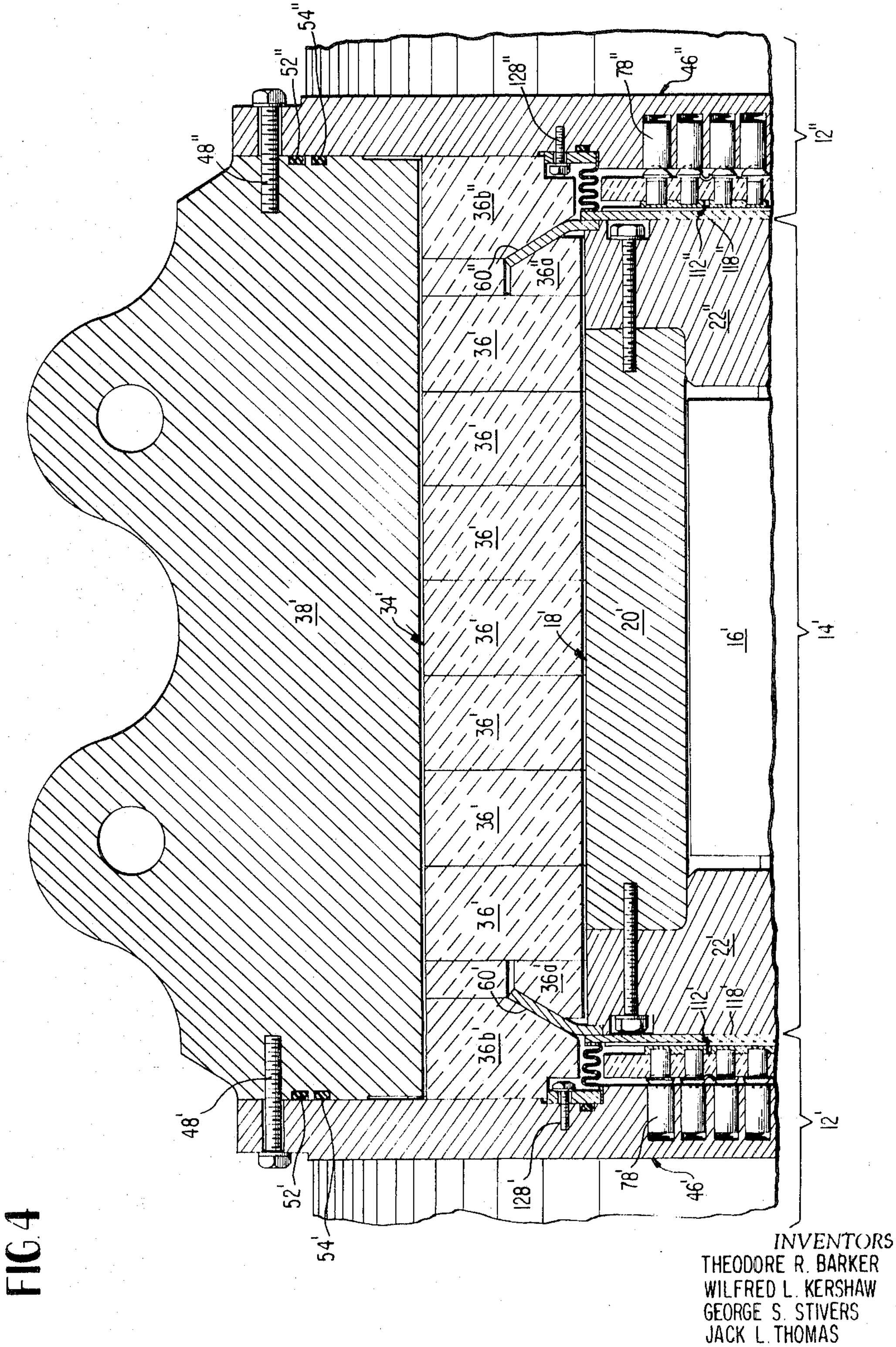
FIG. 4 is an elevational view of an alternate embodiment of the present invention showing a single radioisotopic capsule providing the thermal power for a pair of thermoelectric conversion modules positioned axially at either end thereof.

All of the advantages enjoyed by the radioisotope-powered thermoelectric assembly in the form of an open-ended vessel having a thermoelectric conversion means in planar form overlying the open end are found in a second arrangement which readily doubles the electrical power output. Reference to FIG. 4 shows an alternate embodiment which, rather than being an open-ended cup-like vessel, is in the form of an open-ended cylinder with duplicate thermoelectric conversion means in modular form overlying the opposed open ends.

As such, the assembly comprises a central radioisotope fueled heat source subassembly indicated at 14' with thermoelectric conversion means 12° and 12'' axially positioned in abutting relation to overlie the otherwise open ends of the cylindrical heat source section 14'. The embodiment shown in FIG. 4 is essentially a duplicate of the left-hand section of the embodiment shown in FIG. 2 with the exception that the radioisotopic fuel capsule 16' provides sufficient thermal energy to provide the proper thermal gradient across both conversion means 12° and 12''. As such, similar elements have been given the same numerical designation with the addition of prime and double-prime marks. The cast iron outer casing 38' is in the form of a rather thick, open cylinder surrounding the cylindrical fuel source capsule 16' and its radioactive shielding means 18' in the form of cylindrical member 20' and end caps 22' and 22'', respectively. Thermal insulation means 34' include a series of apertured thermal discs 36' to reduce thermal transfer radially of the assembly and enhance transfer axially through caps 22' and 22'' to the thermoelectric conversion means. Annular retaining rings 60' and 60'' may be sandwiched between insulative discs 36b' and 36a' at the left-hand end of the assembly and discs 36a'' and 36b'' at the right-hand end of the assembly to axially restrain the shielded fuel capsule against inertia shift. Both thermoelectric conversion means 12' and 12'' are identical to the embodiment of FIGS. 1 and 2 and include heat plate members 46', 46'', pistons 78'. 78'' received within respective plate openings and have biasing means tending to bias the thermoelectric conversion subassemblies 12', 12'' in thermal contact with respective covers 118' and 118'', abutting end caps 22' and 22''. The bellows assemblies are coupled to the heat sink plates 46' and 46'' by bolts 128' and 128'', respectively, to allow quick disassembly of the thermoelectric conversion means and replacement of their components. Further, bolts 48' and 48'' allow the thermoelectric conversion modules to be removably coupled to the cast iron vessel 38' in like manner to the previous embodiment. Suitable O-ring seals 52' and 54' at the left-hand ends of the assembly, and 52'' and 54'' at the right-hand ends of the assembly effect a gastight seal between these main subassemblies.

In the operation of both embodiments, the continuous release of thermal energy by the radioisotopic fuel capsule and the thermal barrier set up by the annular insulation means directs the heat axially toward the thermoelectric conversion module or modules. The proper thermal gradient is provided across the modules, whereupon some of the thermal energy is converted into electrical form, which is carried by the leads to an electrical load exteriorly of the generator assembly. Suitable electrical power control means (not shown) may be provided exterior of the generator assembly while some power output control may be provided by changing the gas charge within the fibrous insulation section of the container.

By using a thermoelectric conversion assembly including an apertured insulation disc some physical variance may be provided to the individual thermal elements, that is the diameter of the individual elements may be suitably reduced without effecting misalignment between the alignment pistons and the thermoelectric couples. Further the device is highly flexible insofar as electrical power output is concerned since a number of thermoelectric elements may be eliminated from the thermoelectric conversion assembly and the respective alignment pistons, springs, and buttons may be removed while still allowing the unit to operate successfully. Even a complete thermoelectric subassembly may be readily removed and replaced in a matter of minutes. Further, different fuel capsules of a varying thermal output rate may be substituted for the fuel capsule without in any way modifying the thermoelectric conversion module except for resultant power output.

From the above description it is obvious that the improved generator assembly of the present invention provides a low cost, highly flexible, easily assembled and highly safe radioisotope-powered thermoelectric generator. The entire assembly is easily disassembled without damage. Both subassemblies may be easily disassembled without damage, allowing full replacement of the isotopic fuel capsule as well as the thermoelectric conversion module at low cost and without the need for a hot cell. The design of the module and heat sink as a cover assembly permits field maintenance without breaking module seals.

While there have been shown and described and pointed out the fundamental novel features of the invention as applied to preferred embodiments, it will be understood that various omissions and substitutions in the form of the detail of the device shown and its method of manufacture can be made by those skilled in the art without departing from the spirit of the invention. It is the intention, therefore, to be limited only as indicated by the scope of the following claims.

What is claimed is:

1. A sandwich-type thermoelectric conversion module consisting of a unitary replaceable assembly adapted to be operatively disposed within and removable as a unit from a thermoelectric generator and comprising a metallic plate acting as a thermal heat sink and adapted to form the cover assembly of a thermoelectric generator, a body of thermal insulating material defining a plurality of spaced through openings, a plurality of thermoelectric elements carried within said spaced openings, hot shoes connected to respective ends of selected adjacent thermoelectric elements, bus straps operatively connected to the other ends of selected adjacent thermoelectric elements whereby said body, said thermoelectric elements, said hot shoes and said bus straps comprise an electrical subassembly of said module, a bellows structure having a closed end comprising a heat conductive cover, an open end and a bellows portion, the closed end of said structure overlying said hot shoes of said electrical subassembly but electrically insulated therefrom, the bellows portion of the structure surrounding said electrical subassembly, the open end of said structure characterized by an outwardly directed flange, said heat sink being of sufficient size to extend outwardly of said bellows portion when overlaid therewith to allow the flange of said bellows structure to be detachably engaged with said heat sink, the flange of said bellows structure being detachably engaged with said heat sink to define an enclosed sealed chamber in which said electrical subassembly is contained, said heat sink being electrically insulated from said bus straps, the bellows portion of said bellows structure being stressed during engagement with said heat sink to exert a compressive force on said thermoelectric elements via said hot shoes and bus straps to enhance conduction of thermal energy from said closed end of said bellows structure to said heat sink through said electrical subassembly, and means electrically connected to said bus straps extending out from said chamber in fluid sealed fashion.

2. The thermoelectric conversion module of claim 1, wherein said metallic heat sink plate contains a plurality of holes generally in line with said through openings carried by said body of insulating material and which further comprises alignment pistons of thermally conductive material disposed within said heat sink holes, means biasing said pistons outwardly, against said thermoelectric elements, electrical insulation means positioned between the outer ends of said alignment piston and said thermoelectric elements, said bellows assembly overlying said electrical subassembly and said alignment pistons.

3. An improved thermoelectric generator comprising: a cylindrical member formed of a high radiation capturing material having at least one open end; a radioisotopic heat source positioned within said member; thermal insulation means positioned within said member so as to direct the heat produced by said heat source towards said at least one open end; a radiation shielding plug between said heat source and said at least one open end axially aligned with said cylindrical member having its inner surface in thermal contact with said heat source and its peripheral edge surface enclosed by said insulation means; and closure means for said member overlying said at least one open end of said member, said closure means including thermoelectric conversion means in planar form in heat-receiving relationship with said radiation shielding plug, said conversion means consisting of a unitary replaceable assembly operatively disposed within and removable as a unit from said thermoelectric generator and comprising a metallic plate acting as a thermal heat sink and forming the cover assembly of the thermoelectric generator, a body of thermal insulating material defining a plurality of spaced through openings, a plurality of thermoelectric elements carried within said spaced openings, hot shoes connected to respective ends of selected adjacent thermoelectric elements, bus straps operatively connected to the other ends of selected adjacent thermoelectric elements whereby said body, said thermoelectric elements, said hot shoes and said bus straps comprise an electrical subassembly of said module, a bellows structure having a closed end comprising a heat conductive cover, an open end and a bellows portion, the closed end of said structure overlying said hot shoes of said electrical subassembly but electrically insulated therefrom, the bellows portion of the structure surrounding said electrical subassembly, the open end of said structure characterized by an outwardly directed flange, said heat sink being of sufficient size to extend outwardly of said bellows portion when overlaid therewith to allow the flange of said bellows structure to be detachably engaged with said heat sink, the flange of said bellows structure being detachably engaged with said heat sink to define an enclosed sealed chamber in which said electrical subassembly is contained, said heat sink being electrically insulated from said bus straps, the bellows portion of said bellows structure being expanded during engagement with said heat sink to exert a compressive force on said thermoelectric elements via said hot shoes and bus straps to enhance conduction of thermal energy from said closed end of said bellows structure to said heat sink through said electrical subassembly, and means electrically connected to said bus straps extending out from said chamber in fluid sealed fashion.

4. The thermoelectric generator of claim 3, wherein said metallic heat sink plate contains a plurality of holes generally in line with said through openings carried by said body of insulating material and which further comprises alignment pistons of thermally conductive material carried by said heat sink holes, means biasing said pistons outwardly, against said thermoelectric elements, electrical insulation means positioned between the outer ends of said alignment piston and said thermoelectric elements, said bellows assembly overlying said thermoelectric conversion assembly and said associated alignment pistons.

5. The thermoelectric generator of claim 4, further including a spring positioned within each hole behind respective alignment pistons, wherein the spring constant of the bellows portion of said bellows structure is less than the combined spring constant of the individual alignment springs.

6. The module as claimed in claim 1, further including an O-ring sandwiched between said flange and the face of said heat sink plate to provide a high temperature gastight seal for said thermoelectric conversion assembly.

7. The module as claimed in claim 1, further including getter means within the chamber formed by said bellows assembly and said heat sink metallic plate for absorbing active gases within said chamber.

8. The module as claimed in claim 1, wherein a thin mica sheet is positioned between said heat-conductive cover and said thermoelectric conversion assembly to electrically insulate said thermoelectric elements from said cover.

9. The module as claimed in claim 1, further including means for out-gassing said chamber formed by said bellows structure and said heat sink plate subsequent to said assembly of said module.

10. An improved sandwich-type, thermoelectric conversion module comprising: an annular metallic plate acting as a thermal heat sink including thermal energy dissipating fins on one side thereof and a heat receiving face for transmitting thermal energy on said opposite side, a plurality of spaced annular recesses formed within said thermal transmitting face, a thermoelectric conversion assembly including an annular disc formed of insulation material having spaced apertures corresponding to said heat sink recess, thermoelectric couples carried by said insulation disc with the individual thermoelectric elements positioned within said disc apertures, electrically conductive bus straps soldered to respective ends of adjacent couples to form an appropriate electrical circuit, metallic alignment pistons carried within said heat sink recesses, the heat sink ends of said alignment pistons being recessed, coil springs positioned within said piston recesses and acting to bias said alignment pistons outwardly from said heat sink, the opposite end of said alignment pistons being concave, hemispherical metallic buttons positioned within said concave ends and having their flat surface in contact with respective bus straps, insulation means carried by said flat button surfaces to prevent passage of electrical energy but allow free passage of thermal energy, electrical insulation means covering the face of said thermoelectric conversion assembly remote from said heat sink, a bellows assembly including a heat conductive cover overlying said thermoelectric conversion assembly and said alignment pistons and a bellowslike sidewall surrounding said thermoelectric assembly and means for coupling respective ends of said sidewalls to said heat sink and said cover, and bellows wall being expanded during assembly to cause said thermoelectric elements to be compressed between said cover and said alignment pistons to enhance conduction of thermal energy from said cover to said heat sink through said thermoelectric assembly and said alignment pistons.

11. The module as claimed in claim 10, further including getter means within said chamber intermediate of said cover and said thermoelectric conversion assembly for absorbing the active gases within the chamber formed thereby.

12. The module as claimed in claim 10, wherein said bellows assembly includes an annular flange carried by said bellowslike sidewall remote from said cover, said flange including a series of spaced bolt holes, threaded apertures carried by said heat sink plate spaced radially of said piston receiving recesses, sealing means between said flange and said heat sink face and a plurality of bolts for clamping said flange to said heat sink metallic plate.

13. A sandwich-type thermoelectric conversion module comprising: a metallic plate acting as a thermal heat sink having a plurality of recesses formed therein; a thermoelectric conversion assembly including a plurality of spaced thermoelectric elements generally in line with said recesses; alignment pistons of thermally conductive material carried by said recesses; means biasing said pistons outwardly from said heat sink against said thermoelectric elements; means for electrically insulating said heat sink from said thermoelectric elements; a bellows assembly including a heat conductive cover overlying said thermoelectric conversion assembly and said associated alignment pistons, said bellows assembly including a bellowslike sidewall surrounding said thermoelectric assembly; means for coupling one end of said sidewall to said cover; and means for removably coupling said other end of said sidewall to said heat sink, said bellowslike wall being expended during assembly to cause said thermoelectric elements to be compressed between said cover and respective said alignment pistons to enhance conduction of thermal energy from said cover to said heat sink through said thermoelectric assembly.

14. An improved thermoelectric generator comprising: a cylindrical member formed of a high radiation capturing material having at least one open end; a radioisotopic heat source positioned within said member; thermal insulation means positioned within said member so as to direct the heat produced by said heat source towards said at least one open end; a radiation shielding plug between said heat source and said at least one open end axially aligned with said cylindrical member having its inner surface in thermal contact with said heat source and its peripheral edge surface enclosed by said insulation means; and closure means for said member overlying said at least one open end of said member, said closure means including thermoelectric conversion means in planar from in heat receiving relationship with said radiation shielding plug, said conversion means including a metallic plate acting as a thermal heat sink having a plurality of recesses formed therein, a thermoelectric conversion assembly including a plate formed of insulation material having perforations generally in line with said recesses and a plurality of spaced thermoelectric elements carried within said perforations, alignment pistons of thermally conductive material carried by said recesses, means biasing said pistons outwardly against said thermoelectric elements and a bellows assembly including a heat conductive cover overlying said thermoelectric conversion assembly and a bellowslike sidewall surrounding said thermoelectric assembly and means for coupling respective ends of said sidewall to said heat sink and said cover, whereby said bellows wall, being expanded during assembly, causes said thermoelectric elements to be compressed between said cover and respective alignment pistons to enhance conduction of thermal energy from said cover to said heat sink through said thermoelectric assembly while acting to press the outer surface of said cover in heat-receiving contact with said radioisotopic heat source capsule when said closure means is coupled to said cylindrical member.

15. A sandwich-type thermoelectric conversion module comprising: a metallic plate acting as a thermal heat sink; a thermoelectric conversion assembly including a plurality of spaced thermoelectric elements; thermal insulating means disposed between said spaced thermoelectric elements, said means of the type which generates reactive gasses at the operating temperature of said module to detrimentally affect said thermoelectric elements; a bellows assembly including a heat conductive cover overlying said thermoelectric conversion assembly and a bellowslike sidewall surrounding said thermoelectric assembly; a thin sheet of zironium foil positioned between said thermoelectric conversion assembly and said cover, whereby said foil will absorb said reactive gasses; and means for coupling respective ends of said sidewall to said heat sink and said cover, said bellows wall being expanded during assembly to cause said thermoelectric elements to be compressed between said cover and said metallic plate to enhance conduction of thermal energy from said cover to said heat sink through said thermoelectric assembly.

16. An improved thermoelectric generator assembly comprising: a cylindrical ferrous container having at least one open end; thermal insulation means in solid configuration retaining form positioned within said container and defining a space internally thereof; a shielded heat source including a cylindrical radioisotopic capsule surrounded by radioactive shielding means formed of a material from the group consisting of tungsten, uranium and alloys thereof, said shielded heat source being removably retained within said space; and closure means for said container overlying at least one open end thereof, said closure means including thermoelectric conversion means in planar form in heat-receiving relationship with said shielding means, said thermal insulation means directing heat produced by said heat source toward said closure means, said radioactive shielding means being of sufficient thickness to reduce radiation from said capsule sufficiently to permit safe handling of said capsule for substantially short periods of time and said ferrous container being of sufficient thickness so that the total shielding effect of said shielding means and said container will reduce radiation emitted therethrough to an acceptable level for extended periods of exposure.

17. The generator as claimed in claim 16, wherein said thermoelectric conversion means comprises a thermoelectric module including a platelike heat sink and means for removably coupling said thermoelectric module to the open end of said cup-shaped container.

18. The generator as claimed in claim 16, wherein said thermal insulation means comprises fibrous insulation material and said container further includes means carried thereby for allowing out-gassing of said fibrous insulation material subsequent to assembly of said container and said thermoelectric conversion means.

19. The generator as claimed in claim 16, wherein said thermal insulation means comprises a generally cup-shaped insulation mass surrounding said radioactive shielding means, and said generator assembly further includes an annular retaining ring having an inner diameter less than the diameter of said radioactive shielding means and an outer diameter in excess thereto, and means for coupling said retaining ring to the end of said radioactive shielding means whereby said ring overlies said capsule with the ring outer periphery imbedded in said insulation mass to prevent axial shifting to said radioactive shielding means with respect to said container.

20. The assembly as claimed in claim 16, wherein said cylindrical member comprises a cast iron cylinder of considerable thickness, and said thermoelectric conversion means comprises a planar-type module including a perforated insulating plate with spaced thermoelectric elements carried thereby and means for removably attaching said thermoelectric conversion module to the open end of said cast iron cylinder.

* * * * *